Aug. 12, 1941.   V. F. CARUS   2,252,363

CRACKER MACHINE

Filed March 27, 1939

INVENTOR
VAUGHN F. CARUS
BY George B Wilkey
ATTORNEY.

Patented Aug. 12, 1941

2,252,363

UNITED STATES PATENT OFFICE 2,252,363

CRACKER MACHINE

Vaughn F. Carus, Saginaw, Mich., assignor to Baker Perkins Company, Inc., Saginaw, Mich., a corporation of New York Application March 27, 1939, Serial No. 264,418

5 Claims. (Cl. 146—129)

This invention relates to the manufacture of thin crisp biscuits, crackers and the like. More specifically it pertains to improved means for breaking or snapping strips of freshly baked crackers into shorter units to fit the cartons in which they are to be packed.

Strips of crackers of the kind referred to are snapped off from large transversely scored sheets. Machinery for producing such strips is set forth and claimed in my copending application, Serial No. 264,417, filed March 27, 1939. In that application I have explained how the oven baked sheets usually occupy the whole width of a conveyor, say, about 32-inches for an ordinary sized oven, there being sixteen 2-inch crackers to a row, measured crosswise of the belt. I have also explained how the sheets of crackers are automatically broken off by that machine into strips consisting of one or more rows, united. Strips such as these are intended to be handled in the machine embodying this present invention. For example, the strips of crackers, each being two rows wide and 16 crackers long, are passed along on a discharge belt from the machine alluded to, and as the belt continues on through the present machine the strips are broken automatically into, say, eight squares of four crackers each. The quantity and measurement data given here is solely for purposes of illustration.

The object of my present invention is, therefore, to provide a simplified breaking device to operate with the flexible belt that carries scored strips of baked biscuits, for automatically reducing the strips into unit pieces of suitable size for packaging.

An object is to provide such a simplified device which shall not require that the scores of the biscuits be placed on the belt in an exact relation to the breaking devices, but, on the contrary, a device that will satisfactorily snap the crackers along certain of the scores without injuring the crackers or creating any undesirable quantity of crumbs.

The machine of this application may be used on the same belt as the device described in the copending application alluded to, or it may be used independently of that machine.

The accompanying drawing shows preferred arrangements embodying my invention as it appears when associated with the flexible delivery belt from a cracker oven. Modifications within the scope of the appended claims are likewise shown.

In the drawing Fig. 1 is a plan view of a strip of crackers sixteen crackers long and comprising two joined rows, this being the kind of material piece that the machine is required to snap or break into eight groups of four crackers each arranged in squares;

Figure 1:
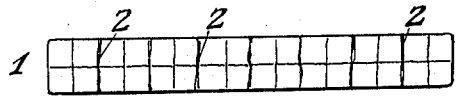

Referring now to Fig. 1, numeral 1 designates in general a strip of crackers made up of one or more rows with frangible scores at appropriate places along the strip.

Figure 2:
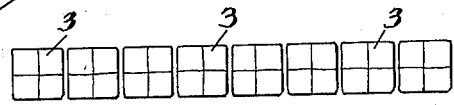
Fig. 2 is a view of the strip shown in Fig. 1 as it appears after having passed through the machine.

Fig. 2 shows the strip after having been broken into units 3 of suitable size for packaging.

Figure 3:
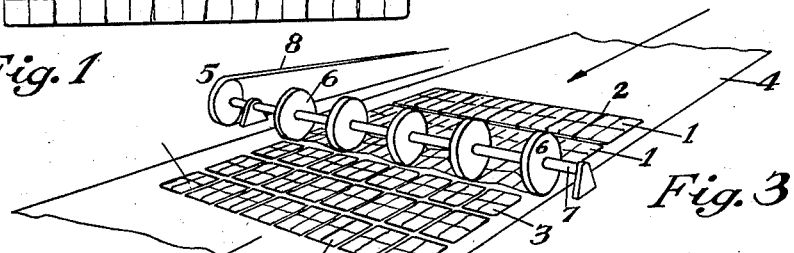
Fig. 3 is a view in perspective showing diagrammatically strips of crackers passing through the breaking device in its preferred form.

In Fig. 3 a traveling belt 4 feeds the strips of crackers through the breaking device indicated generally by the numeral 5, whereby the strips are snapped apart to produce the units 3, 3. The snapping operation is performed without stopping the belt, and feeding is preferably a continuous operation.

Figure 4:
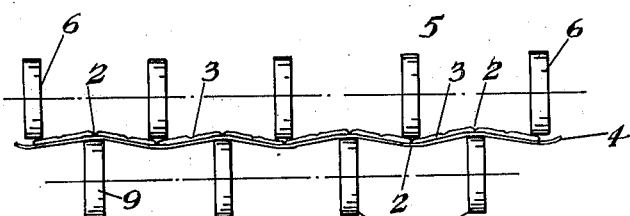
Fig. 4 is a diagrammatic end view of the belt illustrated in Fig. 3, showing the relative arrangement of the upper and lower cracker breaking wheels and of the belt and the cracker strips or work pieces thereon.

Referring to Figs. 3 and 4, numeral 6 designates wheels supported on a suitable transverse shaft 7 about the plane of the flexible belt 4. The shaft 7 may be rotated by a drive belt 8, giving the wheels the same rim speed as the speed of belt 4. It is not necessary in all instances that a drive belt as 8 be provided, for in some situations the wheels 6 may be mounted to turn loosely on, or with the shaft 7. Similarly, a series of wheels are mounted below the belt in alternating or staggered relation with the upper wheels 6. The distance, crosswise of the conveyor, from a wheel 6 to the next succeeding wheel 9 is approximately equal to the distance between the predetermined scores 2, 2.

Belt 4 is thereby flexed at intervals alternately downward and upward by wheels 6 and 9, giving it the serrated appearance shown in Fig. 4. The portions of the belt before and after the wheels are flat, but the portion passing through the wheels is flexed. The degree of flexing is sufficient to fracture crackers at their scores 2.

Alternate scores 2 are broken by being bent upwardly, while the intermediate scores are snapped by being bent downwardly.

Figure 5:
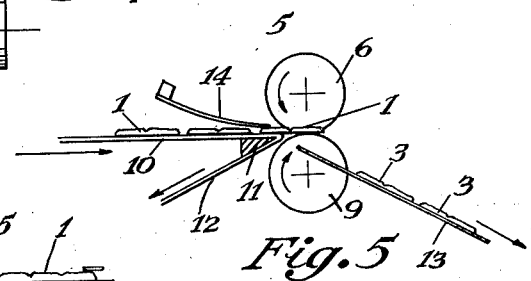
Fig. 5 is a diagrammatic view showing a conveyor of the sharply reversed or nosing type feeding strips of crackers to the breaking wheels, and showing also a take-away element for removing the cracker units in the form illustrated in Fig. 2.

In Fig. 3, on the belt 4 the crackers travel substantially in one plane, whereas in Fig. 5 there is an initial belt run 10 which passes around a nosing 11 and then returns rearwardly in a run 12.

In Fig. 5 the strips of crackers 1 are projected forwardly beyond the nosing 11 and pass between the wheels 6 and 9, where they are flexed and snapped while unsupported except by the wheels. The snapped-off units 3 drop from the wheels onto a take-away inclined element 13 or a conveyor. A hold-down 14 is provided to engage the top faces of the crackers in advance of and close to the fracture of the strip in order to facilitate the feeding of the strip 1 into the wheels in such a manner as to project the strips 1 forwardly beyond the end of the initial run 10 and its nosing 11.

Figure 6:
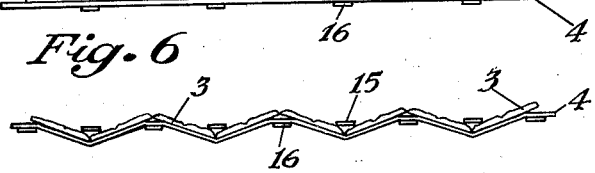
Fig. 6 is a diagrammatic view showing the arrangement of parts at line 6—6 of Fig. 8.
Figure 7:
Fig. 7 is a similar view at line 7—7 of Fig. 8.
Figure 8:
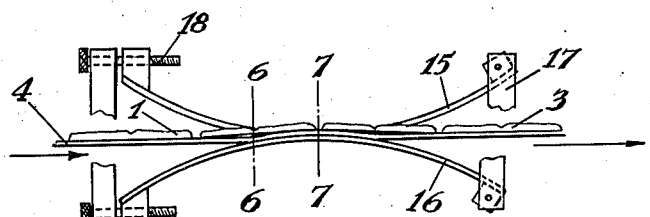
Fig. 8 is a diagrammatic side view showing my invention in modified form, employing opposed bowed springs instead of opposed wheels, as in Figs. 3, 4, and 5.

In Fig. 8 a bowed spring 15 is mounted above the belt 4 to engage the cracker strips 1 at or near the scores 2 and co-operative oppositely bowed members 16 are mounted below the belt, the members 15 and 16 taking the place of the wheels 6 and 9, respectively. Preferably, each bowed spring is mounted at one end on a fixed support 17, the other end being adjustable by means of a screw 18, so as to increase or decrease at will the curvature of the spring and the depth of the resulting serrations in the belt 4, as is indicated in Fig. 7. Springs 15 and 16 may be stressed or relaxed as much as may be necessary to accomplish the desired holding down and snapping action, or they may even be adjusted so as to produce merely slight pressure along the scores 2, 2, without noticeably deflecting the belt 4, as is indicated at 15 and 16 in Fig. 6.

From the foregoing description it is apparent that the strips 1, 1 advance edgewise into the wheels, and the wheels snap them crosswise into units of approximate length for packaging, by bending the strips alternately upward and downward along the length of the strips, which is to say crosswise of the belt.

In the structure shown in Figs. 3 and 4 the belt is flexed along the strip by the action of the wheels 6, 9 and in Figs. 7 and 8 by the action of the bowed members 15, 16. But in the form, Fig. 5, the belt is not flexed by the wheels 6, 9.

In practice this device, following the machine shown in the copending application alluded to, reduces sheets of crackers to package size units efficiently, rapidly, and economically, with almost no breakage or crumbling.

Having thus described my invention, what I claim and desire to secure by Letters Patent is:

1. In a machine of the class described, a flexible belt for carrying strips of crackers formed with frangible scores, a series of wheels having rims engaging the under side of the belt substantially in alinement with certain of said scores and arranged to rotate in the direction of travel of the belt, a second series of wheels rotatable in the direction of belt travel and having rims engaging the top face of the strip of crackers on the belt and substantially in alinement with other scores, the engagement of said series of upper and lower wheels with said crackers and belt respectively being such as to flex the belt adjacent said frangible scores in the strips of crackers engaged by them, such flexings at successive frangible scores being in opposite direction.

2. In a machine of the class described, a belt for carrying strips of crackers formed with frangible scores, a series of wheels having rims engaging the under side of the belt substantially in alinement with certain of said scores and arranged to rotate in the direction of travel of the belt, a second series of wheels rotatable in the direction of belt travel and having rims engaging the top face of the strip of crackers on the belt and substantially in alinement with other scores, the engagement of said series of upper and lower wheels, with said crackers and belt respectively, being appropriate to create bending stresses adjacent said frangible scores in the strips of crackers engaged by them, the stresses at successive frangible scores being opposite in direction.

3. In a machine of the class described, a flexible belt for carrying strips of crackers formed with frangible scores, a series of lower bowed members engaging the under side of the belt substantially in alinement with certain of said scores and arranged lengthwise in the direction of travel of the belt, a series of upper bowed members similarly arranged and engaging the top face of the strip of crackers, the engagement of said series of upper and lower bowed members being appropriate to create bending stresses adjacent the said frangible scores, each bowed member being secured at an end to a fixed support and at its other end having means for adjustably varying the curvature of said member at said point of engagement.

4. In a machine of the class described, a flexible belt for advancing strips of crackers edgewise, said strips having frangible scores that extend in the direction of travel of the belt, a series of members located below the plane of the belt and engaging the under side of the strip of crackers coincidentally with certain of the said scores therein, a second series of members located above the plane of the belt and engaging the top face of the strip of crackers substantially in line with certain other scores therein, the engagements of said two series of members with the strip of crackers being such as to snap the strips crosswise along said frangible scores, and a plurality of yieldable hold-down members engaging the top faces of the crackers intermediate said scores and in advance of and close to the places of fracture of said strip.

5. In a machine of the class described, a flexible belt movable around a nosing for advancing strips of crackers edgewise beyond said nosing, said strips having frangible scores that extend in the direction of travel of the belt, a series of wheels located below the plane of the belt and engaging the under side of the strip of belt of crackers substantially in line with certain of the said scores therein, a second series of wheels located above the plane of the nosing and engaging the top face of the strip of crackers substantially in line with certain other scores therein, the engagements of said two series of wheels with the strip of crackers delivered from the nosing being such as to snap the strips crosswise along said frangible scores, and yieldable holding-down means engaging the top faces of the crackers in advance of the places of contact of said wheels with said strip.

VAUGHN F. CARUS.